United States Patent [19]
Bugga et al.

[11] Patent Number: 5,573,873
[45] Date of Patent: Nov. 12, 1996

[54] LONG LIFE NA/NICL$_2$ CELLS

[75] Inventors: Ratnakumar V. Bugga, Arcadia; Subbarao Surampudi, Glendora; Gerald Halpert, Pasedena, all of Calif.

[73] Assignee: The United States of America as represented by the Administrator of the National Aeronautics and Space Administration, Washington, D.C.

[21] Appl. No.: 291,792

[22] Filed: Aug. 16, 1994

[51] Int. Cl.$^6$ ............................................. H01M 4/32
[52] U.S. Cl. ................ 429/223; 429/103; 429/104; 429/107; 429/122; 429/191; 429/218; 429/221; 429/224; 429/247
[58] Field of Search ........................ 429/103, 104, 429/407, 218, 221, 223, 224, 247, 191, 122

[56] References Cited

U.S. PATENT DOCUMENTS

| | | | |
|---|---|---|---|
| 3,877,984 | 4/1975 | Werth | 136/6 |
| 4,546,055 | 10/1985 | Coetzer et al. | 429/103 |
| 4,612,266 | 9/1986 | Bones et al. | 429/221 |
| 4,795,685 | 1/1989 | Bones et al. | 429/104 |
| 4,966,823 | 10/1990 | Bugga et al. | 429/104 |
| 4,973,534 | 11/1990 | Adendorff et al. | 429/103 |
| 4,975,345 | 12/1990 | Coetzer | 429/103 |
| 4,992,345 | 2/1991 | Meintjes et al. | 429/103 |
| 5,019,470 | 5/1991 | Bugga et al. | 429/223 |
| 5,187,029 | 2/1993 | Coetzer et al. | 429/103 |
| 5,234,778 | 8/1993 | Wright | 429/103 |
| 5,283,135 | 2/1994 | Redey et al. | 429/103 |
| 5,340,668 | 8/1994 | Redey et al. | 429/103 |

OTHER PUBLICATIONS

NASA Technical Memorandum, Exploring the Cell: Sodium |S–Alumina| Cupric Chloride—Aluminum Chloride—Sodium Chloride Between 136°, By Riley O. Miller, Jun. 1975.

Journal of the Electrochemical Society, Accelerated Brief Communications, A Sodium/Beta–Alumina/Nickel Chloride Secondary Cell, By R. C. Galloway, Jan. 1987.

Journal of the Electrochemical Society, Electrochemical Science and Technology, A Sodium/Iron (II) Chloride Cell With a Beta Alumina Electrolyte, R. J. Bones, J. Coetzer, R. C. Galloway, D. A. Teagle, Oct. 1987.

Alternate Cathode S for Sodium—Metal Chloride Batteries, By B. V. Ratnakumar, A. I. Attia, G. Halpert, Jet Propulsion Laboratory, 1991 No month available.

Journal of Power Sources, Sodium–Metal Chloride Battery Research at the Jet Propulsion Laboratory (JPL) By B. V. Ratnakumar, A. I. Attia and G. Halpert, (1991) pp. 385–394 No month available.

Effects of Sulfur additive on the Performance of Na/Nil$_2$ Cells, By B. V. Ratnukumar, S. Surampudi, G. Halpert, Jet Propulsion Laboratory No month or year available.

*Primary Examiner*—Bruce F. Bell
*Attorney, Agent, or Firm*—Thomas H. Jones

[57] ABSTRACT

The premature capacity failure of Ni/NiCl$_2$ secondary cells due to agglomeration of nickel particles on the surface of the NiCl$_2$ cathode is prevented by addition of a minor amount, such as 10 percent by weight of a transition metal such as Co, Fe or Mn to the cathode. The chlorides of the transition metals have lower potentials than nickel chloride and chlorinate during charge. A uniform dispersion of the transition metals in the cathodes prevents agglomeration of nickel, maintains morphology of the electrode, maintains the electrochemical area of the electrode and thus maintains capacity of the electrode. The additives do not effect sintering. The addition of sulfur to the liquid catholyte is expected to further reduce agglomeration of nickel in the cathode.

13 Claims, 3 Drawing Sheets

LONG LIFE NA/NICL$_2$ CELLS

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates to high temperature rechargeable sodium-nickel chloride cells, and more particularly, this invention relates to new cathodes providing longer life sodium-nickel chloride cells.

BACKGROUND OF THE INVENTION

New types of electrical energy storage devices are needed to power electronic devices, electric vehicles and to smooth peak power demands on electric utilities. Some promising devices are based on the use of a solid electrolyte separator such as ceramic, beta alumina solid electrolyte (BASE).

| List of References | |
| --- | --- |
| 3,877,984 | Werth |
| 4,546,055 | Coetzer, et al. |
| 4,612,266 | Bones, et al. |
| 4,795,685 | Bones, et al. |
| 4,966,823 | Bugga, et al. |
| 4,973,534 | Adendorff, et al. |
| 4,975,345 | Coetzer |
| 4,992,345 | Meintjes, et al. |
| 5,019,470 | Bugga, et al. |
| 5,234,778 | Wright |

STATEMENT OF THE PRIOR ART

Since the discovery in 1962 that the material β"-alumina was a good sodium ion conductor, several studies were made on its use as solid electrolyte separator in various battery systems with liquid sodium as anode. The interest for many years has been focused on sodium-sulfur battery, which has many attractive features such as high density, high rate discharge capability permitted by a good (comparable to aqueous electrolytes) ionic conductivity of ⊕"-alumina solid electrolyte (BASE) at high temperatures and long cycle life and negligible self discharge. However, there are certain difficulties associated with the use of sodium-sulfur batteries. In particular, due to the highly corrosive nature of sulfide melts, material selection for the current collector in the positive electrode is very critical and limited to a few possible choices. Also, there is a likelihood of BASE degrading in polysulfide melts. Further, the inherent violent reaction between liquid sodium and liquid sulfur demand a rather sophisticated design of the battery to circumvent the safety problem in the event of failure of the solid electrolyte ceramic.

A new class of high temperature, sodium rechargeable batteries based on transition metal chlorides as positive electrodes have emerged in the last decade. These systems are similar to the sodium-sulfur batteries in terms of anode half cell and the (high) energy densities. In addition, the use of solid metal chloride cathodes in basic chloraluminate melts results in several significant advantages, including lower operating temperatures, improved safety and high reliability. Excellent performance characteristics have been demonstrated with both Na/FeCl$_2$ and Na/NiCl$_2$ systems in small and large cells as well as in batteries.

However, a problem associated with the use of NiCl$_2$ is an agglomeration of the electrode particles causing a premature failure in the cycle life.

Addition of elemental sulfur alleviates this problem almost completely. Sulfur, however, is rather aggressive to the cell components causing corrosion problems similar to those in Na/S cell. Additionally, sulfur also affects the stability and reversibility of NiCl$_2$ at high concentrations. A non sulfur additive with the beneficial effects of sulfur is needed.

Adendorff and Coetzer teach adding 0.1 to 10 weight percent of transition metals other than Ni, Fe, Co, Cr or Mn to an active cathode so that the transition metal does not become chlorinated during charging.

The closest reference is Meintjes, et al. who discloses an active cathode substance for a Na/Cu cell comprising Fe, Ni, Co, Cr, Mn and mixtures thereof. It could be argued that Meintjes generally discloses Ni cathode comprising Ni with Co, Mn or Fe.

Bugga, et al. discloses a method of preparing a cathode in which a matrix of a metal nobler than the cathode metal is present.

Wright discloses coating a cathode current collector with graphite. Bones, et al. discloses Na-FeCl$_2$ cells.

STATEMENT OF THE INVENTION

The present invention relates to a non-sulfur additive to the nickel chloride cathode that prevents premature failure due to agglomeration of the electrode particles. The additive is not corrosive and has no effect on the quality of the sintered electrodes. A uniform dispersion of the additives in the cathode matrix prevents agglomeration of the nickel particles, thus retaining the morphology/capacity of the electrode. Furthermore, the additives utilized in the invention are more compatible than sulfur without posing any corrosion problems to the positive current collector (usually nickel) since the current collector is thermodynamically stable toward the additives.

DETAILED DESCRIPTION OF THE INVENTION

Agglomeration of nickel particles on the surface of the electrode is prevented in accordance with the invention by the addition of a minor amount of a transition metal such as manganese, cobalt or iron having a lower potential than nickel to a sinterable mixture of nickel and sodium chloride to form a cathode for a sodium-nickel chloride electrochemical cell. The transition metal is present in an amount from 1 to 25% by weight of the cathode, preferably from 5 to 15% by weight of the cathode. The transition metal forms a chloride during charge of the cell preventing agglomeration of nickel particles at the electrode. The added transition metal chloride can participate in the cell reactions, thus contributing to the energy density of the cell. The combination of addition of a transition metal and sulfur may provide synergistic results.

The battery of the invention is based on a body of molten metal anode, solid ionic ceramic separator and a solid inorganic cathode in a molten salt. An anode current collector is in contact with the body of molten sodium and a cathode current collector is in contact with the catholyte. The anode current collector can take the form of a cylindrical or U-shaped metal tube such as stainless steel and the cathode current collector is preferably a sintered $NiCl_2$ electrode containing a uniform dispersion of 1 to 25% by weight of a transition metal having a lower potential than nickel and being capable of reversible chlorination in the cell.

The solid electrolyte is preferably a thin film of beta alumina which is a sodium ion conductor. Beta alumina and beta"-alumina or their mixtures are members of the class of materials known as solid electrolytes or fast ion conductors. These materials have ionic conductivities much larger than their electronic conductivities and thus act as electrolyte as well as separator. Beta"-alumina solid electrolyte (BASE) has a higher sodium conductivity than Beta alumina and is usually fabricated as a dense microcrystalline sintered ceramic. It is inert to reaction with elemental sodium at temperatures as high as 1300K. Its Na+ conductivity at 300° C. is 0.2–0.4 $ohm^{-1}$ $cm^{-1}$.

The solid electrolyte can assume different configurations such as a flat barrier film or the solid electrolyte can be provided in cylindrical form. The surface can be planar or corrugated. The solid electrolyte usually utilizes a fairly thin film, typically having a thickness from 0.01 to 0.2 cm, generally around 0.1 cm.

The liquid catholyte comprises a mixture of salts of Group I and Group III metals which is molten at the operating temperature of the battery. The molten salt is preferably a Group I metal salt and can be a mixture of Group I and Group III metal salt such as a sodium tetrachloroaluminate ($NaAlCl_4$). The molten salt is preferably maintained basic by saturating with NaCl. The ratio of $NaAl:AlCl_3$ is preferably 1:1.

Figure 1:
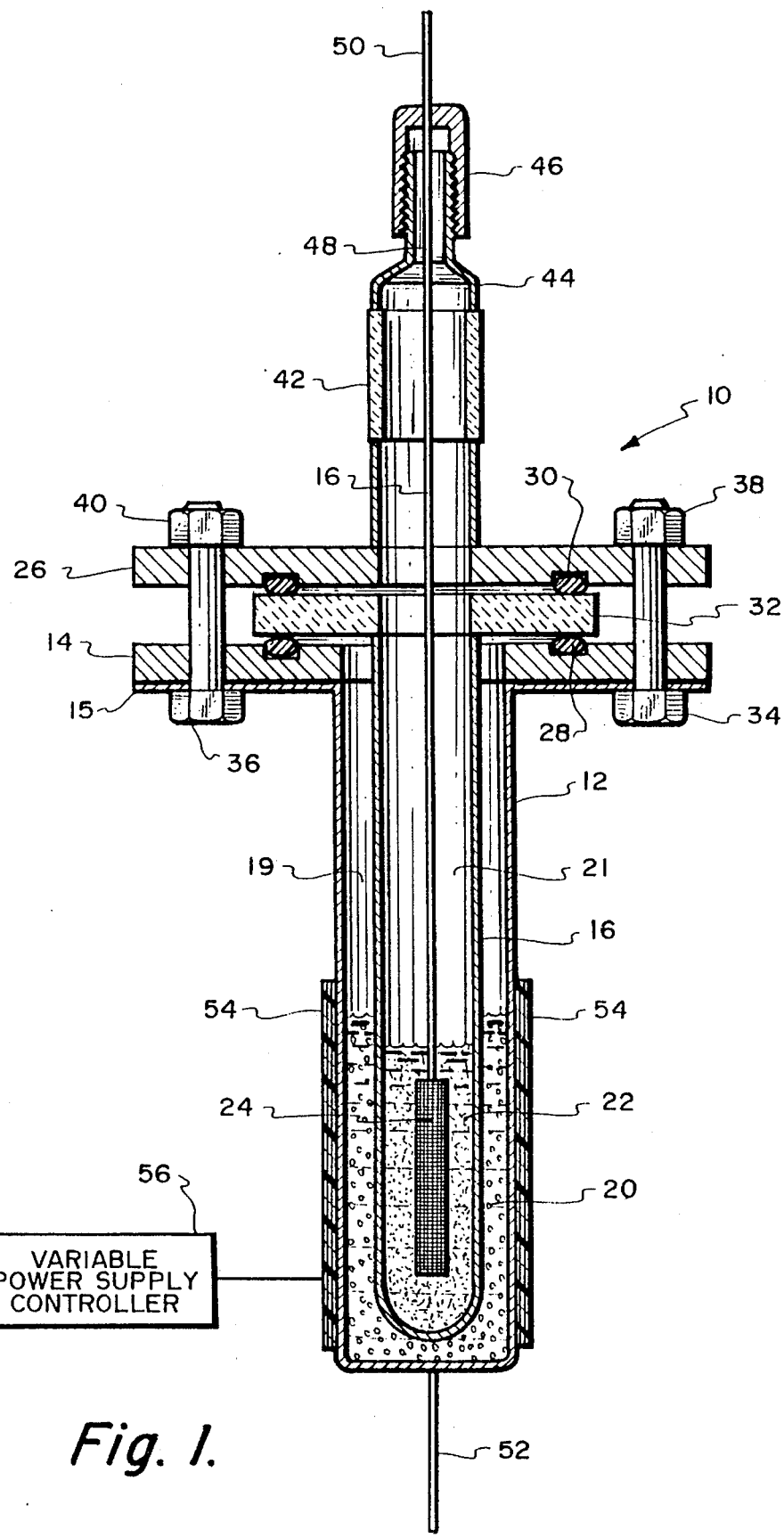
FIG. 1 is a schematic view of a Na/NiCl$_2$ cell according to the invention.

Referring now to FIG. 1, a battery cell 10 comprises an outer cylindrical tube 12 having a flange 14, suitably formed of a conductive, corrosion resistant metal such as stainless steel. A BASE tube 16 is supported within the outer tube 12 forming an annular chamber 19 between the outer tube 12 and the BASE tube 16 for receiving body 20 of liquid anode such as sodium. A second chamber 21 is formed within the BASE tube 16 for receiving a second body 22 of catholyte. A current collector/electrode 24 such as sintered $NiCl_2$ containing a minor amount of transition metal is immersed within the body 22 of catholyte.

A flange 26 is connected to the BASE tube 16 above and parallel to the flange 14. A ceramic spacer, insulator 32 such as alumina is disposed between the o-rings 28, 30. The interior opposed surfaces of the flanges 14, 26 and ceramic header 32 are grooved to receive o-rings 28, 30. The annular space 18 is sealed by the means of threaded connector 34, 36 received through apertures in the flanges 14, 26 and tightened by means of nuts 38, 40. A ceramic insulator sleeve 42 can be provided on the upper neck 44 of the BASE tube 16. The top of the tube 16 can also be sealed with a cap 46 which receives the lead 48 connecting the current collector 24 to the positive terminal 50. The negative terminal 52 is connected to the outer tube 12. A heater tape 54 can be wrapped around the outer tube. The heater is connected to a variable power supply, controller 56.

Sodium-nickel chloride test cells were constructed with a central cathode design. A stainless steel (SS) tube acted as the cell container as well as the negative terminal. A Beta"-alumina solid electrolyte tube placed inside the SS tube separated the cathode and anode half cells. The columnar volume between the SS tube and the beta tube contained enough sodium to make the cells cathode limited. The insides of the beta tube were filled with sodium tetrachloroaluminate fused salt electrolyte. The sintered $NiCl_2$ electrode containing 10% Co, Mn or Fe immersed in the molten salt acted as the positive electrode. For the fabrication of the $NiCl_2$ electrode, INCO nickel powder type 255 (~3 micron) was used. Sodium chloride obtained from Aldrich was preheated and pulverized to get a particle size less than 100 micron. All the cell fabrication and testing operations were carried out in an argon-filled glove box. Cell cycling was performed by Macsym system developed in-house. Morphological studies on the cycled electrodes were made using scanning electron microscopy. All the experiments were carried out at a temperature of 275° C., unless specified otherwise.

The $NiCl_2$ electrodes were fabricated by a cosintering of fine powders of Ni and NaCl mixed in the mole ratio of 3:1 and containing a uniform dispersion of 10% by weight of Co, Mn or Fe. On formation, one third of the Ni would thus be chlorinated, with the rest of the Ni acting as its grid. The built-in capacity of the electrode would correspond to its NaCl content.

Before the sintering process, the electrode powders were pressed at a minimum pressure. Loose sintered electrode from type 255 Ni powder would have a volume porosity in excess of 85%, which decreases both during pressing carried out before sintering and due to NaCl addition. $NiCl_2$ electrodes could also be made by loose sintering, simply by filling the beta alumina tube with the electrode powders and producing sintered-like structure during initial charge. However, such electrodes would not permit any postmortem analysis unless the beta tubes are crushed. For the present study, therefore, the electrodes were pressed before sintering for ease of dismantling after cycling, while focusing on high electrode porosity.

The first batch of the electrodes were fabricated in prismatic or cylindrical configuration at a compaction pressure of 10,000 psi. The electrodes obtained (1 Ah) are fairly dense, the charge density being 575 mAh/cc. The electrodes were preferably made in cylindrical shape with a split mold, in order to extract the electrode easily from the mold. Pressures enough to handle the electrode before sintering were adopted. These electrodes (2 Ah) also have a high charge density of 490 mAh/cc. The conversion efficiency of the electrodes has, however, improved to 60% at a rate of 100 (20 h) and increased to 70% after one charge-discharge cycle. The conversion efficiency decreased to 45% at 200 mA (10 h) but increased to ~100% at 25–50 mA (80 to 40 h). The next generation of electrodes were fabricated in loose sintered form. The cylindrical mold was filled with the electrode powders and the electrode was sintered while being retained in the mold. These electrodes (2 Ah) appeared highly porous and have a low charge density of 296 mAh/cc. The current efficiencies of these electrodes are accordingly high, almost 100% at a charge rate of 100 mA (20 h) (FIG. 1).

The sintering of the electrode was carried out in an inert (argon) atmosphere at temperatures slightly below melting point of NaCl (801° C.) for a period of 2 hours. In subsequent experiments, the sintering was carried out for only 15 min and in a reducing atmosphere (3% hydrogen).

2 Ah cells were fabricated and tested with no additive and with 10 weight percent of Co, Mn or Fe. These cells were cycled between 2.0 and 3.0 V vs. Na+/Na.

These cells have been typically charged at C/20 (or C/40) and discharged at C/10 rate. The capacity of the standard cell started falling sharply from 12th cycle and a reached a plateau value of 0.6 Ah (about 40% of the initial value) within 25 cycles. It is important to note that the failure of the cell appeared to be a hindered charging process. The discharge efficiency, on the other hand, continued to be high. Charging of the $NiCl_2$ electrode involving dissolution of NaCl is known to be a slow process. The charging process appears to be critically dependent on the electrode porosity.

Post-mortem analysis carried out on the cells revealed that in the cell without additive, the electrode appears to have hardened during cycling, possibly due to agglomeration. It was found to be difficult to disassemble the electrode from the beta" tube, whereas the electrode containing transition metal additives appeared powdery and could be easily removed. Scanning electron micrographs reveal that there is a considerable agglomeration in the electrode during cycling in the absence of transition metal in SEM micrographs of the $NiCl_2$ electrode before cycling (i.e. after sintering), after 60 cycles in sulfur-free electrolyte, after 50 cycles 2 Ah cell with 2% S and after 40 cycles in 3 Ah cell with 2%, respectively. The grain is increased from an initial value of $^-15\ \mu$ to $50\text{--}60\ \mu$ during cycling in the cell without additive.

Figure 2:
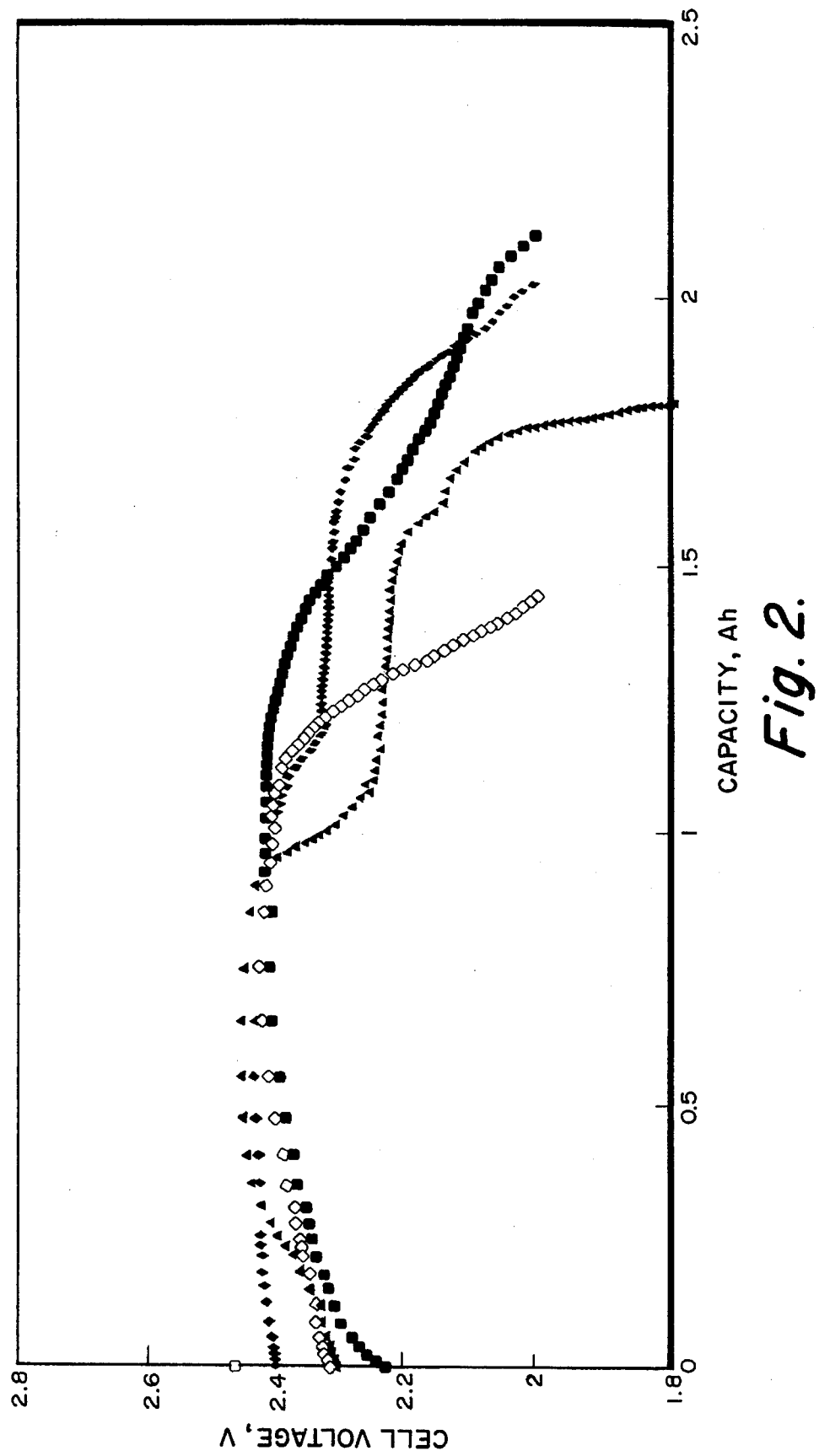
FIG. 2 are a set of discharge curves of 2 Ah NiCl$_2$ electrodes with no additive, with 10% by weight percent Co, Mn or Fe.

Referring now to FIG. 2, Discharges curves of 2-Ah "loose sintered" $NiCl_2$ electrode in the electrolyte are shown as; (■) with no additive; (♦) with 10 wt. % cobalt; (◊) with 10 wt. % manganese; and (▲) with 10 wt. % iron. From the charge-discharge curves, it is clear that a distinct voltage plateau corresponding to the metal additive may be seen especially with cobalt and iron (FIG. 2). The plateaus due to cobalt and iron chlorides occur at $^-50$ mV and 250 mV less than of Ni, respectively. Manganese, on the other hand, would not undergo any reversible electrochemical reaction on the potential range studies.

Figure 3:
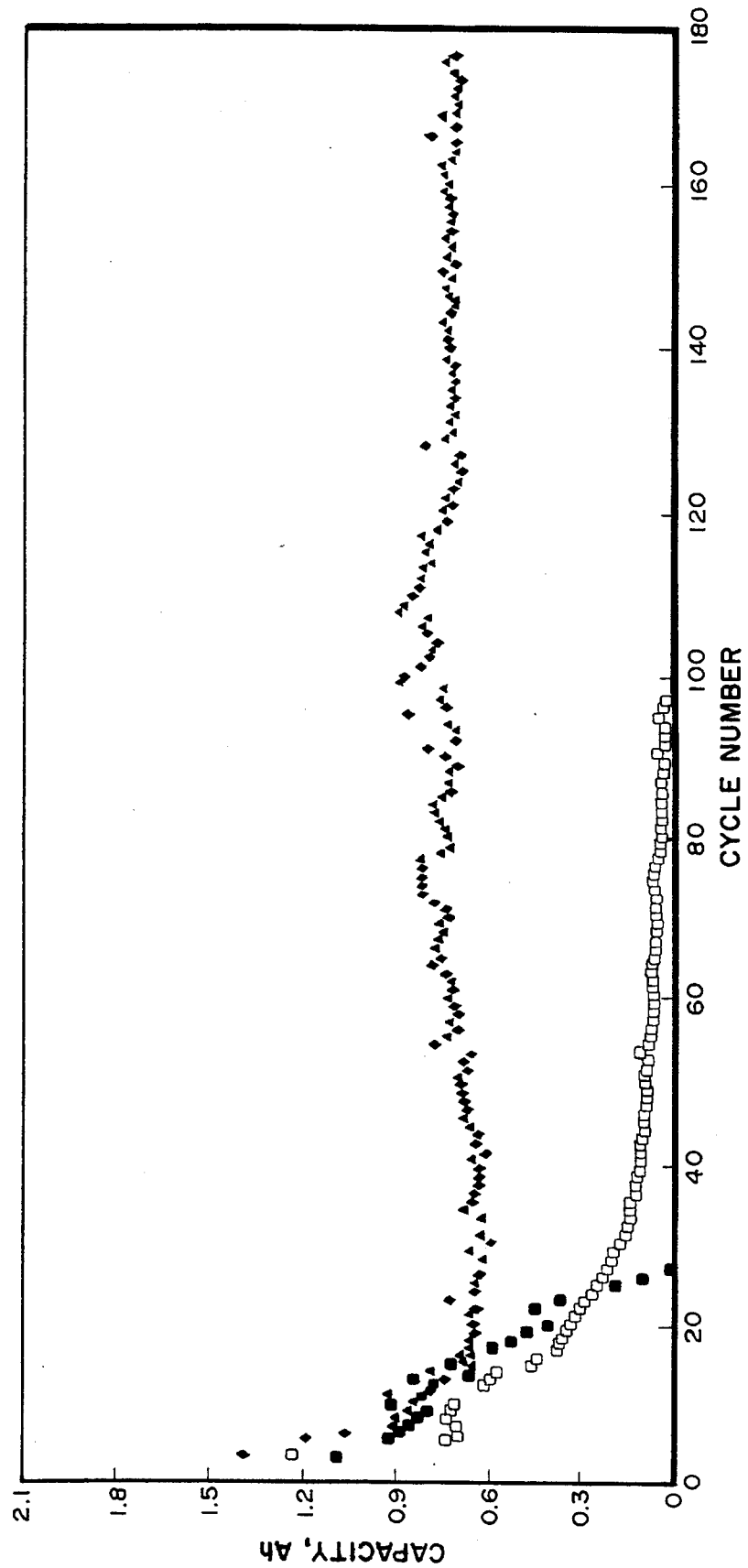
FIG. 3 is a set of curves showing variation of capacity of 2 Ah NiCl$_2$ electrodes with no additive or with 10% by weight percent Mn or Fe.

Referring now to FIG. 3, variation of capacity during cycling at 10-h rate of 2-Ah "loose-sintered" $NiCl_2$ electrode in the electrolyte are shown as: (■) with no additive; (□) with 10 wt. % manganese; and (♦) with 10 wt. % iron. Cells of Ah capacity and containing 10% Fe, Co or Mn as additives to the cathode were cycled and compared with the standard (without additive) cell (FIG. 3). As may be seen from FIG. 3, cells with the metal additives exhibit better capacity retention than the standard cell. Besides, the additives also undergo reversible electrochemical reaction in the potential range of 2.0–3.0 V, thus contributing to the cell capacity and energy density, which otherwise would have decreased. The cell with cobalt failed prematurely, possibly due to a failure of the solid electrolyte. The internal resistance values obtained from AC impedance are 0.23, 0.34, 0.17 and 0.22 m_ for the standard cell and the cells with Co, Fe and Mn additives respectively.

Transition metal additives, according to the invention, are found to have no adverse effect on the quality of the sintered structure. Since the potentials of the corresponding chlorides of the transition metals is lower than that of $NiCl_2$, there is chlorination of these metals during charge, thus forming mixed chloride cathodes. A uniform dispersion of these additives in the cathode matrix prevents agglomeration of nickel particles while retaining the morphology/capacity of the electrode. Furthermore, these additives are more compatible without posing any corrosion problems to the positive current collector (usually nickel), since nickel is thermodynamically stable towards the transition metals.

Though the beneficial effect of the transition metals reducing agglomeration is not a pronounced as with sulfur, a synergistic effect on agglomeration of nickel can be expected in a cell having a $NaCl_2$ electrode containing 1–25% by weight of a transition metal and a basic chloroaluminate electrolyte containing 0.1 to 5 percent by weight preferably 0.5 to 1.0 percent by weight of sulfur.

Furthermore, since the transition metal additives are less corrosive than sulfur, the cell containing the combined additives should have longer cell life.

The high temperature rechargeable sodium-nickel chloride cells of the invention are useful in applications requiring long cycle life, high energy and power densities such as electric vehicles, load leveling and space applications.

It is to be realized that only preferred embodiments of the invention have been described and that numerous substitutions, modifications and alterations are permissible without departing from the spirit and scope of the invention as defined in the following claims.

We claim:

1. An electrode for a $Na/NiCl_2$ secondary battery comprising $NiCl_2$ containing a dispersion of from 1 to 25 percent by weight of particles of a transition metal having a lower potential than nickel.

2. An electrode according to claim 1 in which the transition metal reversibly chlorinates under the electrochemical condition of the cell.

3. An electrode according to claim 2 in which the transition metal is selected from the group consisting of Co, manganese and iron.

4. An electrode according to claim 3 in which the transition metal is present in an amount from 5 to 15 percent by weight.

5. An electrode according to claim 4 in which the transition metal is present in an amount of about 10 percent by weight.

6. An electrode according to claim 1, in which particles of nickel, the transition metal and sodium chloride are sintered to form said electrode.

7. A rechargeable $Na/NiCl_2$ cell comprising in combination a first body of molten sodium;

a second body of molten basic aluminate salt;

a ceramic separator which transports sodium ions between said bodies disposed between and separating said bodies;

an anode connected to the first body; and a cathode immersed in the second body said cathode comprising nickel chloride containing a dispersion of a minor amount of particles of a transition metal having a lower potential than nickel.

8. A cell according to claim 7 in which the transition metal is present in the cathode in an amount from 1 to 25 percent by weight.

9. A cell according to claim 8 in which the transition metal reversibly chlorinates during charge-recharge cycling of the cell.

10. A cell according to claim 9 in which the transition metal is selected from the group consisting of cobalt, manganese and iron.

11. A cell according to claim 7 in which the second body includes from 0.1 to 5 percent by weight of sulfur.

12. A cell according to claim 11 in which the second body contains from 0.5 to 1.0 percent by weight of sulfur.

13. A cell according to claim 7 in which the cathode is formed from a sintered mixture of particles of nickel, the transitions metal and sodium chloride.

\* \* \* \* \*